US009553921B2

(12) United States Patent
Riegler et al.

(10) Patent No.: US 9,553,921 B2
(45) Date of Patent: Jan. 24, 2017

(54) METHOD FOR DOWNLOADING CONTENT FROM A SERVER ONTO A RECORDING MEDIUM AS WELL AS RECORDING MEDIUM BEING SUITABLE THEREFOR

(71) Applicant: SONY DADC AUSTRIA AG, Anif (AT)

(72) Inventors: Andreas Riegler, Tenneck (AT); Erich Hoepoldseder, Anif (AT)

(73) Assignee: SONY DADC AUSTRIA AG, Anif (AT)

( * ) Notice: Subject to any disclaimer, the term of this patent is extended or adjusted under 35 U.S.C. 154(b) by 0 days.

(21) Appl. No.: 14/146,984

(22) Filed: Jan. 3, 2014

(65) Prior Publication Data

US 2014/0181251 A1   Jun. 26, 2014

Related U.S. Application Data

(63) Continuation of application No. 11/408,942, filed on Apr. 24, 2006, now Pat. No. 8,645,486.

(30) Foreign Application Priority Data

Apr. 22, 2005 (EP) .................... 05008893

(51) Int. Cl.
    *G06F 15/16*    (2006.01)
    *H04L 29/08*    (2006.01)
    *H04L 29/06*    (2006.01)

(52) U.S. Cl.
    CPC ............ *H04L 67/10* (2013.01); *H04L 29/06* (2013.01); *H04L 29/06027* (2013.01); *H04L 69/329* (2013.01)

(58) Field of Classification Search
    CPC .... H04L 67/10; H04L 29/06; H04L 29/06027; H04L 69/329
    (Continued)

(56) References Cited

U.S. PATENT DOCUMENTS 6,434,535 B1 *  8/2002  Kupka ................. G06F 21/10
                                           380/228
6,845,398 B1 *  1/2005  Galensky ............ G06Q 20/32
                                           709/203

(Continued)

FOREIGN PATENT DOCUMENTS

CN   1397896 A    2/2003
EP   1 081 574 A1  3/2001
(Continued)

*Primary Examiner* — Thu Ha Nguyen
(74) *Attorney, Agent, or Firm* — Oblon, McClelland, Maier & Neustadt, L.L.P.

(57) ABSTRACT

A method for transferring content from a server (2) onto a recording medium (14), said server (2) being accessible via a communication network (4), comprises the following steps:
a) connecting said recording medium (14) to a networkable device (3),
b) establishing a connection between the networkable device (3) and said server (2) via said communication network (4), and
c) transferring content from said server (2) onto said recording medium (14) via said networkable device (3),
wherein at least one of steps b) and c) is managed by an application which is provided on said recording medium (14) and which is activated or is activatable after said recording medium (14) has been connected to said networkable device (3).

18 Claims, 2 Drawing Sheets

(58) Field of Classification Search
USPC .......... 709/201, 210, 217–219; 705/14, 26.1, 705/27.1
See application file for complete search history.

(56) References Cited

U.S. PATENT DOCUMENTS

| | | | |
|---|---|---|---|
| 7,165,062 B2* | 1/2007 | O'Rourke | |
| 7,257,714 B1* | 8/2007 | Shen | 713/186 |
| 7,430,595 B2* | 9/2008 | Morita et al. | 709/223 |
| 7,466,823 B2* | 12/2008 | Vestergaard | H04L 29/06027 380/202 |
| 7,493,368 B2 | 2/2009 | Raverdy et al. | |
| 7,881,656 B2* | 2/2011 | Khedouri et al. | 455/3.01 |
| 7,949,870 B2* | 5/2011 | Lieu | 713/153 |
| 8,176,101 B2* | 5/2012 | Rosenberg | 707/822 |
| 8,327,454 B2* | 12/2012 | Jogand-Coulomb et al. | 726/27 |
| 8,417,575 B2* | 4/2013 | Nakajima | G06Q 30/06 705/26.1 |
| 8,737,821 B2* | 5/2014 | Li | H04N 5/783 345/173 |
| 2001/0016836 A1* | 8/2001 | Boccon-Gibod | G06Q 20/3829 705/51 |
| 2001/0054087 A1* | 12/2001 | Flom et al. | 709/218 |
| 2002/0069243 A1* | 6/2002 | Raverdy et al. | 709/203 |
| 2002/0156546 A1* | 10/2002 | Ramaswamy | H04L 29/06 700/94 |
| 2002/0157974 A1 | 10/2002 | Krahn | |
| 2002/0161795 A1* | 10/2002 | O'Rourke | 707/500 |
| 2002/0165811 A1* | 11/2002 | Ishii | G06Q 30/0601 705/36 R |
| 2002/0194355 A1* | 12/2002 | Morita et al. | 709/231 |
| 2003/0018586 A1 | 1/2003 | Krahn | |
| 2003/0023594 A1* | 1/2003 | Ramamurthi | 707/7 |
| 2003/0028664 A1* | 2/2003 | Tan | G06F 21/10 709/237 |
| 2003/0079038 A1* | 4/2003 | Robbin | G06F 1/1613 709/232 |
| 2003/0165128 A1* | 9/2003 | Sisodia et al. | 370/338 |
| 2004/0068536 A1 | 4/2004 | Demers et al. | |
| 2005/0021478 A1 | 1/2005 | Gautier et al. | |
| 2005/0033994 A1* | 2/2005 | Suzuki | H04L 63/083 726/19 |
| 2006/0018208 A1* | 1/2006 | Nathan | G06Q 20/10 369/30.06 |
| 2006/0035707 A1* | 2/2006 | Nguyen | G07F 17/32 463/29 |
| 2006/0100924 A1* | 5/2006 | Tevanian, Jr. | 705/14 |
| 2006/0101116 A1* | 5/2006 | Rittman et al. | 709/204 |
| 2006/0155648 A1* | 7/2006 | Vandewater et al. | 705/51 |
| 2006/0253568 A1* | 11/2006 | Lin | 709/224 |
| 2007/0083323 A1* | 4/2007 | Rosenberg | 701/200 |
| 2007/0118426 A1* | 5/2007 | Barnes, Jr. | G06Q 10/1053 379/114.13 |
| 2007/0174302 A1 | 7/2007 | Ishiguro et al. | |
| 2007/0220100 A1* | 9/2007 | Rosenberg | 709/206 |
| 2007/0239557 A1* | 10/2007 | Phillips | 705/26 |
| 2007/0266065 A1* | 11/2007 | Rosenberg | 707/205 |
| 2008/0027819 A1* | 1/2008 | Ruckart et al. | 705/26 |
| 2008/0082813 A1* | 4/2008 | Chow et al. | 713/2 |
| 2008/0091796 A1* | 4/2008 | Story et al. | 709/217 |
| 2008/0092198 A1* | 4/2008 | Hutten | 725/133 |
| 2008/0114692 A1* | 5/2008 | Jogand-Coulomb et al. | 705/59 |
| 2008/0133291 A1* | 6/2008 | Nasser | G01S 19/09 705/7.34 |
| 2008/0162666 A1* | 7/2008 | Ebihara et al. | 709/217 |
| 2008/0195474 A1* | 8/2008 | Lau et al. | 705/14 |
| 2008/0232371 A1* | 9/2008 | Hildreth et al. | 370/392 |
| 2008/0253237 A1* | 10/2008 | Fu | 369/1 |
| 2009/0007204 A1* | 1/2009 | Yang et al. | 725/110 |
| 2009/0132415 A1* | 5/2009 | Davis | G06Q 20/10 705/43 |
| 2009/0276324 A1* | 11/2009 | Rothschild | 705/26 |
| 2010/0023328 A1* | 1/2010 | Griffin et al. | 704/231 |
| 2010/0042499 A1* | 2/2010 | Barton | G06Q 30/0255 705/14.53 |
| 2010/0269145 A1* | 10/2010 | Ingrassia et al. | 725/110 |
| 2011/0138486 A1* | 6/2011 | White | 726/30 |
| 2012/0290456 A1* | 11/2012 | Story et al. | 705/34 |
| 2012/0331177 A1* | 12/2012 | Jensen | 709/248 |
| 2013/0024539 A9* | 1/2013 | Khedouri et al. | 709/217 |
| 2013/0064110 A1* | 3/2013 | Polinati et al. | 370/252 |
| 2013/0080644 A1 | 3/2013 | Kimura | |
| 2013/0159193 A1* | 6/2013 | Tang | G06Q 20/1235 705/51 |
| 2014/0258854 A1* | 9/2014 | Li | G11B 27/34 715/702 |
| 2015/0081673 A1* | 3/2015 | Kaneko | G06F 17/30029 707/722 |
| 2015/0087369 A1* | 3/2015 | McIntyre | G07F 17/3225 463/11 |
| 2015/0181299 A1* | 6/2015 | Rauber | G06Q 30/02 725/1 |

FOREIGN PATENT DOCUMENTS

| | | |
|---|---|---|
| EP | 1 276 295 A2 | 1/2003 |
| WO | WO 00/29928 | 5/2000 |
| WO | WO 01/38993 A1 | 5/2001 |
| WO | WO 02/08927 A1 | 1/2002 |
| WO | WO 2004/066126 A1 | 8/2004 |

* cited by examiner

METHOD FOR DOWNLOADING CONTENT FROM A SERVER ONTO A RECORDING MEDIUM AS WELL AS RECORDING MEDIUM BEING SUITABLE THEREFOR

CROSS-REFERENCE TO RELATED APPLICATIONS

This application is a continuation application of and claims the benefit of priority under 35 U.S.C. §120 from U.S. application Ser. No. 11/408,942, filed Apr. 24, 2006, the entire contents of which is incorporated herein by reference and which is based upon and claims the benefit of priority under 35 U.S.C. §119 from European Patent Application No. 05008893.9, filed Apr. 22, 2005.

DESCRIPTION

The invention relates to a method for downloading content being stored in a database of a server onto a recording medium and to a recording medium being suitable to perform said method.

Internet media downloads, for example music data downloads or video data downloads have become very popular in recent years. However, current download procedures are still very complicated. First, a user has to find an internet download platform which offers the music data or video data he wants to download. Second, the user usually has to download a software program needed for performing the download procedures onto his downloading device, for example a personal computer or a handheld, and to install said software program on his downloading device. Third, the user has to register himself. Usually, the registration procedure requires to transmit sensitive details like credit card numbers via the internet to a registration device. Fourth, the user can start to download music data or video data by starting the software program which he has installed before. Last, the downloaded content has to be stored on the target recording medium like a CD (compact disk) or a portable MP3 player; to do this, usually a disk burn process or a data transfer process is necessary.

It is an object of the present invention to provide a method for downloading content via a communication network, in particular via the internet, which, compared to the downloading method described above, is more transparent and more easy to handle by an unexperienced user.

In order to solve this problem, this application discusses a method for downloading content. Further, discusses a recording medium and a server. A backup method and a computer program product are also discussed.

According to the present invention, a method for transferring content from a server onto a recording medium, the server being accessible via a communication network, comprises the following steps:
a) connecting said recording medium to a networkable device,
b) establishing a connection between the networkable device and the server via the communication network, and
c) transferring content from the server onto said recording medium via the networkable device,
wherein at least one of steps b) and c) is managed by an application which is provided on the recording medium and which is activated or is activatable after said recording medium has been connected to the networkable device.

The networkable device may for example be a device having functionality for communicating with the internet or intranet or for communicating with several types of networks at the same time. Generally, the invention can be used in conjunction with any type of network, for example an intranet, an IEEE 1394 network, or the like. The networkable device may for example be a personal computer, a mobile phone or a handheld device having internet access, respectively.

The recording medium may for example be a "pure" memory device like a CD (compact disk), a DVD (digital versatile disk), a hybrid CD, a blue ray disk, a hard disk, a memory stick, a memory card or an EPROM (erasable programmable read-only memory). All suitable CD-, blue ray disk-, hybrid CD- or DVD formats may be used. In particular, CD-ROM or DVD-ROM formats may be used. "Write once" (CD-R, DVD-R) formats or "write many" (CDRW, DVDRW) formats may be employed. In addition, the recording medium may be a part of a "non pure" memory device like a handheld, a portable media player (which may for example be optical media based, chip media based or magneto-optical based) like a MP2/3/4 player, a mobile phone or the like. The term "MP2/3/4 player" in this context in particular means a portable computing device having an area of read-write memory (for example a semiconductor memory or a Hard disk (HDD) memory) and having at least one software and/or hardware codec (coder-decoder) for replaying data files. Such devices have become generally known as MP3 players. The data files may represent audio and/or video or other media and may include for example formats such as MPEG1, MPEG2, MPEG4, MP3, ATRAC™, WMA, WAV, JPEG, TIFF, AVI or PCM files.

The application managing the establishment of the connection between the networkable device and the server and the process of downloading content from the server is preferably realized as a software program. The software program is stored on the recording medium itself. In case that the recording medium is a "pure" memory device, the application is read out of the recording medium and executed on the networkable device. Alternatively, if the recording medium is part of a "non pure" memory device (for example a handheld or a MP2/3/4 player), the application may be read out of the recording medium and executed on the device itself (which is of course only possible if the device shows the necessary computing functionality in order to execute the application). In the latter case, the application may for example be realized in form of a digital signal processor "DSP" (in this case the application does not have to be read out from the memory device; rather, the application is executed within the DSP), an EPROM unit which is removably attached to the device, or the like, i.e. in form of a "hardware extension" of the device.

Preferably, the application is activated automatically when a recording medium is connected to the networkable device. If the recording medium is for example a recordable CD, and the networkable device is a personal computer having internet access and a CD player/CD burner, the application being stored on the CD may be read out from the CD and executed on the PC automatically after the CD has been inserted into the CD player/CD burner.

In a general sense, the term "connecting the recording medium to a networkable device" means to enable the networkable device to write data onto the recording medium and/or to read data (for example the application data) from the recording medium. For example, the term "connecting the recording medium to an networkable device" may mean that a CD is inserted into the CD burner/CD player so that data can be burned onto the CD and data can be read from the CD. In case that the recording medium is already part of a networkable device like a EPROM chip in a networkable handheld device, the term "connecting the recording medium to a networkable device" means activating a physically already existing data connection between the recording medium and computing functionality of the networkable device.

Preferably, the application reads access information which is stored on the recording medium and which is needed to access content to be transferred from the server to the recording medium. Access information may for example be internet address information, authentication information (pass words, serial numbers (identifiers)), or the like. The access information can be used to determine which amount and/or kind of content may be transferred from the server to the recording medium.

Generally, the term "transferring" may for example mean a "normal" downloading process or a "direct" downloading (streaming) process. If the transformation process of content from the server onto the recording medium is realized as a direct downloading process (streaming), parts of a content item which have already been transferred from the server to the networkable device are written onto the recording medium before all remaining parts of the content item have been transferred from the server to the networkable device. In case of a normal downloading process the complete downloaded data is stored as a whole on the networkable device (in a buffer) before the data is transferred to the recording medium. The direct downloading process shows the advantage that it prevents piracy since the downloaded data is only buffered portion by portion in the memory of the networkable device. The user of the PC would not be able to make unauthorized copies from the whole downloaded data since the data is not stored as a whole on the networkable device.

If the networkable device is an internet capable device, a network software like a browser or a FTP (file transfer protocol) software may be installed on the networkable device. The browser can be used to establish an internet connection between the internet capable device and the server according to internet address information being contained within the access information. The network software may send authentication information being contained within the access information to the server. The server receives the authentication information and initiates an authentication procedure being executed on the server side. The authentication procedure denies access to at least some of the downloadable content if the authentication information being sent to the server does not match a predetermined authentication pattern stored or generated within the server.

Alternatively, the authentication procedure may also be performed within the internet capable device: the authentication procedure denies access to at least some of the downloadable content if authentication information being input by a user into the networkable device does not match authentication information being included with the access information. In this case the user may get the authentication information when buying the recording medium from the vendor.

Generally, the use of access information, in particular authentication information enables a user to pay the price for downloading the content via the internet in advance: The user pays the price for the recording medium itself and the price for the content to be downloaded at once when he is buying the recording medium. The vendor of the recording medium can then notify the server which offers the content to be downloaded that a user trying to download content from the server using a specific authentication information (which is stored on the recording medium and is sent to the server by the application later) is allowed to download content. In case that the recording medium is a CD, the authentication information may for example be an individual number being embedded within the CD. If the server already "knows" all serial numbers of CDs which may be sold in future, the step of notifying the server when a specific CD is sold is not necessary. If theft of CDs occurs, there is the possibility to disable this CDs (the serial numbers) at the server, so that it is not possible to download content for this recording media. This aim can also be achieved if the access information is stored on the recording medium only at the time of purchase.

Access information (authentication information; address information) may be adapted to the users individual demands and be stored on the recording medium at the time of buying the recording medium. For example, if a user wants to buy a CD including eight classic music pieces of Mozart, the access information (authentication information; address information) may be adapted from the vendor of the recording medium such that the user is automatically guided to a download platform or a part of the download platform comprising only classic music pieces of Mozart. For example, The access information (authentication information; address information) is further adapted such that the user is allowed to download exactly eight pieces of classic music of Mozart. Thus, the client's individual demands are considered at the time of purchasing the recording medium in terms of individual access information (authentication information; address information) created at the time of buying the recording medium. Individual authentication information can also be stored at the time of fabricating the CDs. The vendor the sells the "right" CD to the user according to his demands.

As already mentioned, authentication information may be stored as data (preferably encrypted data) on the recording medium. Alternatively or additionally, at least a part of it may be entered subsequently by a user. It may for example include information from a scratch-off panel on the recording medium or its packaging. Authentication information or part thereof may be stored on a separate data carrier such as a near field communication device (e.g. Felica™).

The access information may also be encrypted, i.e. comprise encrypted internet address information and/or encrypted authentication information. For example, a browser being installed on the networkable device may be provided by the application with an encrypted link being embedded within the recording medium which cannot be decrypted by the user, but which is nevertheless decryptable by the browser itself. In this case, the user would not know to which internet address he is guided. Therefore, authentication information would not be absolutely necessary.

The server may create or change application specific status information each time when content is transferred or has been transferred from the server onto the recording medium, the status information allowing the server to decide how much content or which kind of content still is allowed to be transferred by a specific application from the server onto the recording medium.

Preferably, the status information comprises a certain amount of credit or credit points specifying which amount or type of content is allowed to be transferred from the server onto the recording medium. The points system can be realized as nominal points system which is suitable for overcoming currency fluctuations when the data carrier is distributed internationally. Alternatively, the points system can be realized as actual monetary value point system. For example, the credit points may represent a value of 40,00 € .

Content items may be priced at different levels. For example, in the case of audio files, if more than ten tracks are downloaded in one session, then a bonus track is free. Downloading a whole "album" may be offered at a lower cost than downloading tracks individually.

The change of status information may comprise the step of decreasing the amount of credit or credit points stored within the server according to the amount and type of transferred content.

Application specific initial status information may be prestored within the server or be generated according to the access information when the corresponding application contacts the server for the first time: Consider the case where access information comprises no "direct" credit point information, however comprises a serial number. In this case, each serial number may be assigned to a specific amount of credit points according to a look-up-table being prestored in the server and comprising serial number-to-credit points assignments. When a specific application contacts the server, the server assigns the serial number received to a specific amount of credit points while making use of the pre-stored look-up-table comprising serial number-to-credit points assignments. This assignment can be regarded as application specific initial status information. The assignment described above makes it possible to create groups of serial numbers, each serial number of one group being assigned to the same credit point value. The look up table may be generated by the producer of the recording media and supplied both to the server and the recording media vendor. The vendor then sells that recording medium to a user which comprises a serial number corresponding to the credit point value desired by the user.

Alternatively, the application may update the access information each time when content is transferred or has been transferred from the server onto the recording medium, the updating of access information allowing the application or the server to decide how much content or which kind of content still is allowed to be transferred from the server onto the recording medium. The update of access information may be done by changing access information being stored on the recording medium, i.e. by changing the content of the recording medium.

The updating of access information may be initiated by the server which notifies the application each time when content is transferred from the server onto the recording medium. The access information may comprise a certain amount of credit or credit points, wherein the amount of credit or the number of credit points specifies which amount or type of content is allowed to be transferred from the server onto the recording medium.

The updating of access information may comprise the step of decreasing the amount of credit or credit points stored on the recording medium according to the amount and type of transferred content.

In a preferred embodiment, at least a part of the communication network is the internet. However, the invention can be applied to any type of network or combination of networks.

The content to be downloaded may already be exactly specified by the access information being stored on the recording medium. For example, the access information may be adapted such that the user is only allowed to download one specific content item. Alternatively, the user may only be restricted as far as the amount of downloadable content or a general classification of downloadable content is concerned. In this case, the user needs a content selection user interface enabling a user to select specific content items to be downloaded.

The content selection user interface may for example be an application which is executed on the server side or within the networkable device. Further, the content selection user interface may be an application being executed on the device comprising the recording medium, for example on a MP2/3/4 player if said device has a suitable man machine interface, for example a display. Using the content selection user interface, it is possible to download content selected by the user.

The server may also comprise functionality to remember what type of content has been downloaded in conjunction with a specific application (i.e. in conjunction with a specific authentication information like a serial number). Each time the specific application contacts the server again, the server proposes the user to download content which is similar in type. For example, if a user has downloaded only Mozart music so far, the server may suggest to download the newest available Mozart content. The server may for this purpose create a user profile for each specific application. Consequently, this user profile gets the more detailed the more often the application performs content download.

Further, the application and the server may provide the possibility to "preview" the content which is intended to be downloaded. For example, a user may have the possibility to hear a part of a song desired to download or to watch a part of a video clip desired to download. The kind and amount of the preview may be determined by preview information being included within the access information. If a user is for example willing to pay a higher price for a recording medium, he may enjoy better (longer) preview. In the same manner as described above, the preview information may also be "included" within a serial number; each serial number may therefore imply specific credit point information and specific preview information. The preview content may be determined from a user profile (or a pool of user recommendations). Content related to the user's selection may be promoted or advertised in this way. The preview content may include perceivable degradation. A user may, for a fee, remove the perceivable degradation without having to re-download the preview content. Suitable systems are for example described in EP 1215907, WO03/067886, WO04023471 and EP1465157.

Each item of downloaded content may be protected by an algorithm that prevents further copying. Algorithms that allow only a limited number of further copies may be used. Each piece of content or the data carrier itself may be uniquely fingerprinted (by embedding imperceivable identification data into the content). This allows tracking and/or policing of any illegally distributed copies of the content downloaded to the data carrier and made available e.g. over the internet.

The method for downloading content according to the present invention provides the following advantages: It is not necessary to select a specific download platform since the access information being stored on the recording medium automatically guides a user to a specific download platform being suitable to download the content he desires. Further, the user does not need to install software on his downloading device in order to download the desired content, since this task is already done by the application which is provided/stored on the recording medium and which is advantageously executed automatically upon connecting the recording medium to the networkable device. In addition, it is not necessary to register, i.e. to transmit sensitive payment details via the internet since the payment has already been done at the time of buying the recording medium. It is only necessary to transmit the authentication information to the server, which, however, does not mean any risk for the user who wants to download content.

The present invention further provides a recording medium, comprising a data storage area having available data storage capacity, and an application which, upon connection of the recording medium with a networkable device, can manage to establish a network connection between the networkable device and a server being connectable to the networkable device by a communication network, and to transfer content from the server to the data storage area.

The application may be a software program which is pre-stored within the data storage area, and which can be read out of the data storage area and be executed on the networkable device.

The application may be adapted to be activated automatically when the recording medium is connected to the networkable device.

The access information may be pre-stored within the data storage area, the access information being readable by the application and being needed to access downloadable content stored within the server.

The access information may determine which amount and/or kind of content may be transferred from the server during the transferring process.

The recording medium may be a recordable CD, a recordable DVD, a hybrid CD, a recordable blue ray disk, a hard disk, a memory stick, a memory card, a memory part of a MP 2/3/4 player, or the like.

The application may comprise graphical user interface software allowing a user to graphically control the application when the graphical user interface is executed on the networkable device or the recording medium.

The application may be adapted to perform an authentication procedure on the networkable device, the authentication procedure denying access to at least a part of the content to be transferred from the server onto the recording medium if authentication information being input by a user into the networkable device does not match authentication information being included within the access information.

The access information may comprise encrypted internet address information and/or encrypted authentication information.

The application may be adapted to activate a content selection user interface enabling a user to select specific content items to be transferred from the server to the recording medium, wherein the kind and/or amount of content items is determined by authentication information and/or internet address information included within the access information.

The application may be adapted to update the access information each time when content is transferred or has been transferred from the server onto the recording medium, the updating of access information allowing the application or the server to decide how much content or which kind of content still is allowed to be transferred from the server to the recording medium.

The application may be adapted to update access information being stored on the recording medium.

The application may be adapted to receive a notification from the server instructing the application to update the access information.

The access information may comprise a certain amount of credit or credit points, wherein the amount of credit or the number of credit points specifies which amount or type of content is allowed to be transferred from the server onto the recording medium.

The application may be adapted to update access information by decreasing the amount of credit or credit points stored on the recording medium according to the amount and type of transferred content.

The invention further provides a server being accessible via a communication network, comprising:
means for storing content which is downloadable by a networkable device from the server via the communication network,
means for creating or changing device specific status information each time when content is transferred or has been transferred from the server onto the device, the status information allowing the server to decide how much content or which kind of content still is allowed to be transferred by a specific device from the server onto the device.

The server may comprise notifying means for sending a notification to the networkable device, the notification specifying which amount or kind of content has already been transferred or is presently transferred to the networkable device.

The status information and/or the notification may comprise credit or credit point information, wherein the amount of credit or the number of credit points specifies which amount or type of content has already been transferred or is presently transferred from the server to the networkable device.

The server may further show all features which have been discussed above in the context of the method and the recording medium according to the present invention.

In a more general sense, the present invention further provides a backup method, the backup method transferring content from a computing device onto a recording medium, comprising the following steps:
a) connecting the recording medium to the computing device,
b) transferring content from the computing device onto the recording medium,
wherein step b) is managed by an application which is provided on the recording medium and which is activated or is activatable after said recording medium has been connected to the networkable device.

Advantage of this backup method is that the application manages the complete backup process (automatically or interactively) so that no additional software for the backup process is needed.

The present invention further provides a computer program product comprising computer program means adapted to perform the tasks of the application described above when it is executed on a computer, a digital signal processor, or the like.

For a better understanding of the invention, the invention will be explained by way of example while making reference to the accompanying drawing, wherein.

Figure 1:
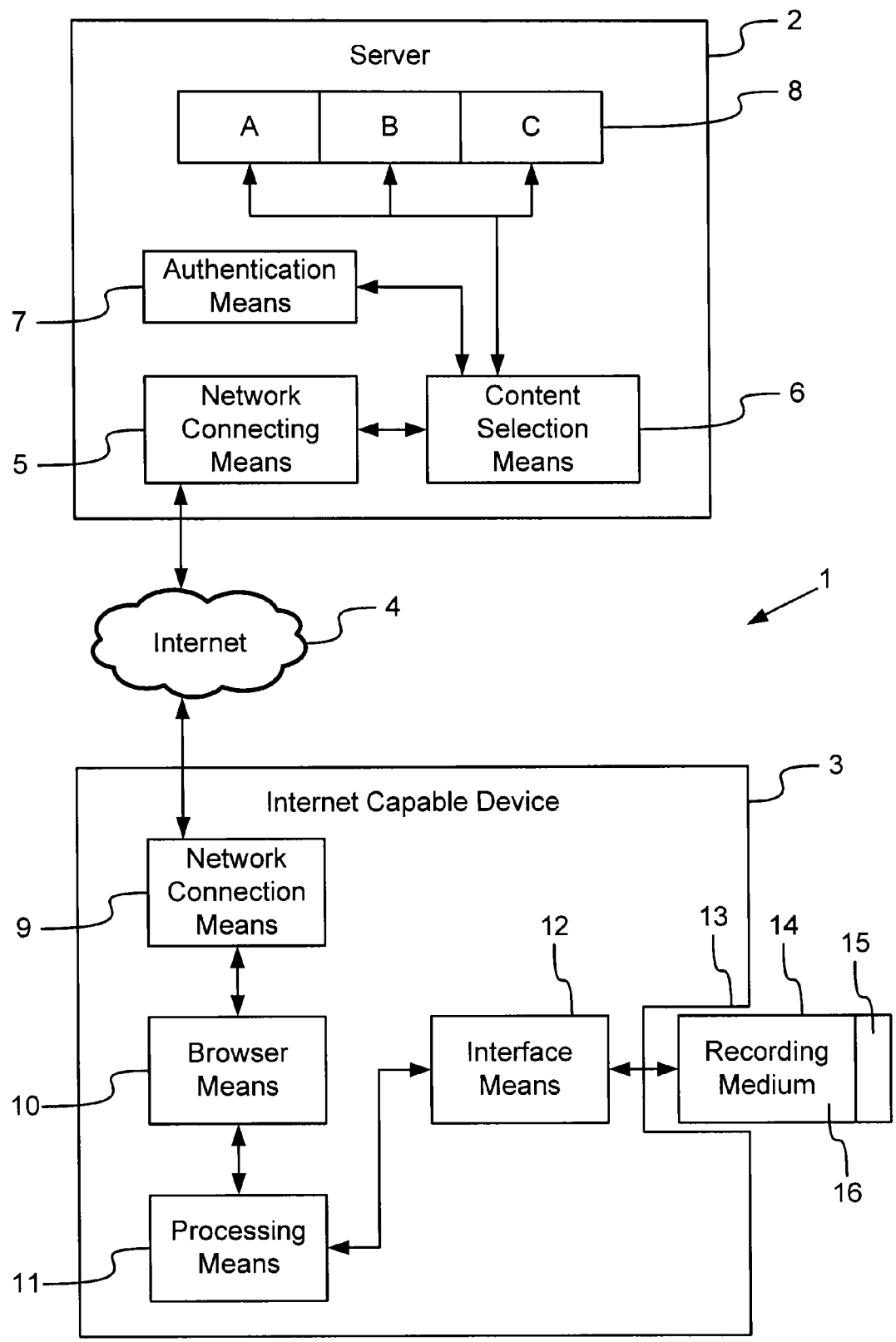
FIG. 1 shows a preferred embodiment of a system suitable to perform the method according to the present invention.

In FIG. 1 a preferred embodiment of a system 1 suitable to perform the method according to the present invention is shown. The system 1 comprises a server 2, an networkable device 3 and a communication network 4 (internet) which connects the networkable device 3 with the server 2.

The server 2 comprises a network connecting means 5, a content selection means 6, an authentication means 7, and a database 8. The database 8 comprises three different content parts A, B, and C. The network connecting means 5 connects the server 2 to the internet 4 and to the content selection means 6. The content selection means 6 is connected to the authentication means 7 and to each of the content parts A, B, C of the database 8.

The networkable device 3 comprises a network connecting means 9, a browser means 10, a processing means 11, an interface means 12 as well as means 13 for connecting a recording medium 14 to the networkable device 3. The network connection means 9 connects the networkable device 3 to the internet 4 and is also connected to the browser means 10, which itself is connected to the processing means 11. The processing means 11 is connected to the interface means 12 which is responsible for establishing a connection between the networkable device 3 and the recording medium 14 via the connecting means 13.

In the following a preferred embodiment of the method according to the present invention will be described.

The user buys the recording medium 14 at a shop. The recording medium 14 comprises an application section 15 in which an application is stored. Further, in the application section 15, access information including internet address information and authentication information is stored. The recording medium 14 further comprises a recording section 16 onto which content to be downloaded can be stored.

After having bought the recording medium 14, the user inserts the recording medium 14 into the networkable device 3. The interface means 12 automatically reads out the application stored within the application section 15 and inputs the application into the processing means 11. The processing means 11 starts the application. The application reads out access information being stored within the application section 15 of the recording medium 14 and activates the browser means 10. The browser means 10 is automatically provided with the internet address information being included within the access information and establishes an internet connection via the network connection means 9 and the internet 4 to the network connection means 5 of the server 2. The user uses the browser means 10 to communicate with the content selection means 6 in order to select desired content to be downloaded from the database 8 onto the recording medium 14. The content selection means 6 may for example launch a content selection application enabling the user to choose desired content to be downloaded which is presented within a window of the browser means, for example. The content selection means 6 forwards authentication information being included within the access information which has been sent from the browser means 10 to the content selection means 6 to the authentication means 7. The authentication means 7 checks whether the user is allowed to download the kind and/or amount of content he desires. If, for example, the authentication information matches a predetermined authentication pattern being stored within the server 2, the user is allowed to download content stored within the content part A. If the authentication information matches a different authentication pattern stored within the server 2, the user may be allowed to download content being stored within the content part B. If the authentication information matches a further authentication pattern stored within the server 2, the user may be allowed to download content being stored within the content parts A and B. The application being executed within the processing means 11 controls the downloading process of the content as well as the storing process of the downloaded content onto the recording medium 14.

Advantage of the method described above is that the user has only to insert the "prepaid" recording medium 14 into the networkable device 3 and to choose desired content. The establishment of the internet connection, the downloading process as well as the selection process of content to be downloaded is completely managed by the application itself. Thus, content can be downloaded from a server with a minimum of effort.

Figure 2:
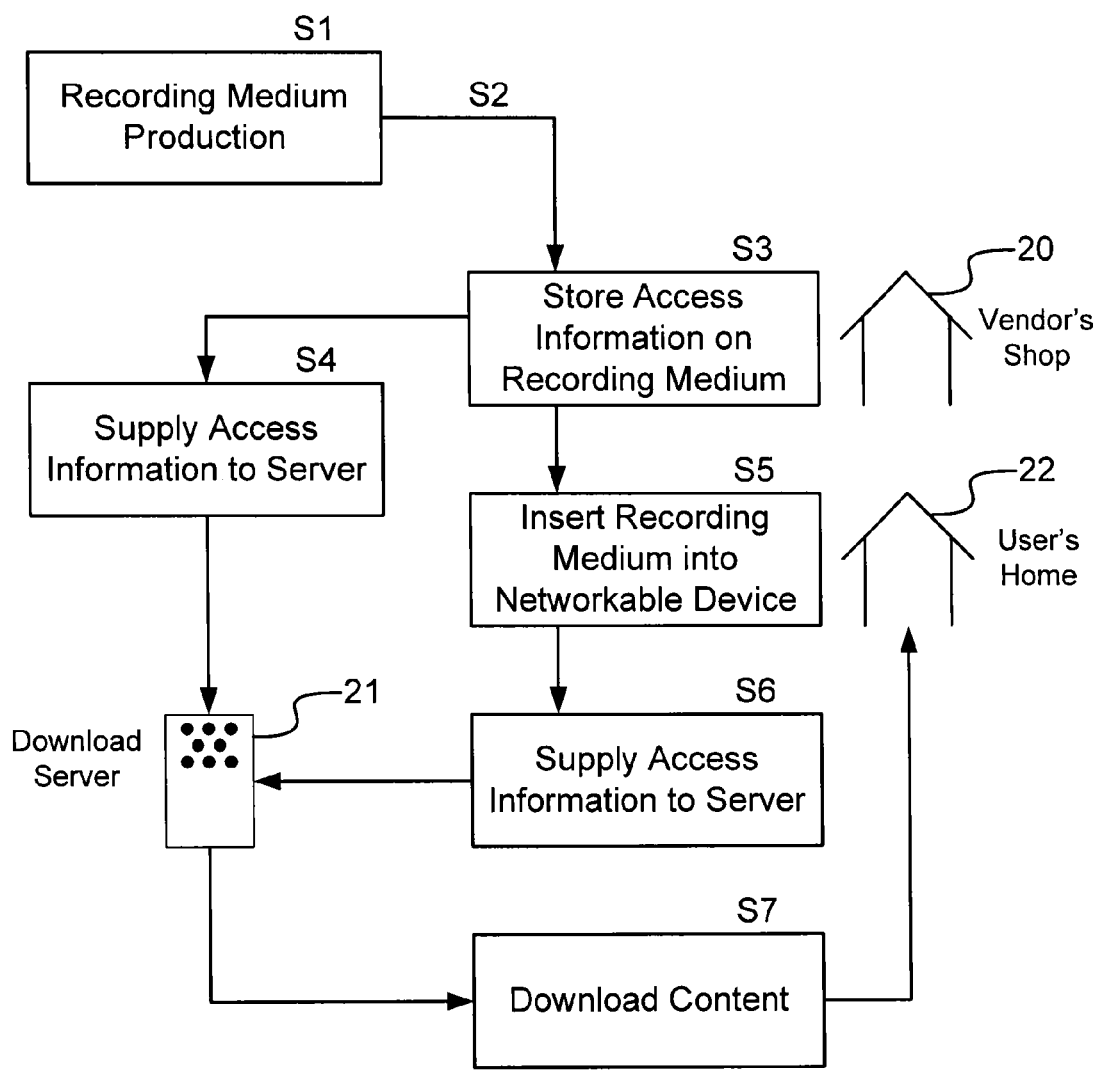
FIG. 2 shows a schematic drawing illustrating the invention in a larger context.

FIG. 2 illustrates the present invention in a larger context: Recording media are manufactured in a first step S1. The recording media are delivered to a vendors shop 20 in a second step S2. A user decides at the vendor's shop 20 how much and what type of content he wants to download. According to his decision, in a third step S3, corresponding access information is stored on the recording medium. This access information (or parts thereof) is supplied to a download server 21 in a fourth step S4. Then, in a fifth step S5, the user connects the recording medium to a networkable device at the user's home 22, thereby automatically supplying the access information (or parts thereof) to the server 21 in a sixth step S6. The server 21 compares the access information supplied from the vendor with the access information supplied by the user and enables the user to download corresponding content (S7).

In the following description, further aspects of the invention will be described.

There are several known download mechanisms:

CD on Demand:

Certain online or retail services allow the user to select the content he wants on a disk via a kiosk or web interface and then deliver the CD with package either directly in the retail store or ship it to the consumer, after he has purchased the product.

n-CD:

n-CD is a technology which allows to individualize disks by putting a serial number onto each disk (PID), respectively. This number can then be read by software applications on a PC to allow various download processes/applications to be performed, including prepaid models. The disk is not recordable.

Download Platforms on the Internet:

After the user has decided for an internet download platform (iTunes™, Connect™, Napster™, . . . ), he usually needs to download and install a client, register his user data and give sensitive payment details. He then can start downloading content, which is stored on the PCs hard disk. Content can then be burned on a CD-R or is transferred to a portable audio player.

The shortcomings of the download solutions described above are:

1) Very complex to use:
   First a user needs to decide for a platform, which implicates several consequences in terms of formats, drm, jukebox client and supported hardware.
   As a next step the user needs to download a proprietary jukebox (20-60 MB) and install the software.
   To be able to start downloading music, the user needs to register.
   the user needs to give sensitive payment details, such as credit card number
2) Most download platforms offer hundreds of thousands of songs, giving limited orientation to the user.
3) The downloaded content is stored on a hard disk only.

In contrast, according to a preferred embodiment of the present invention, a small, individualized software client stored on a recordable media disk is automatically started when the disk is inserted into a CD/DVD/BlueRay/HD burner and allows a user to easily select various content items which are then downloaded and securely stored on the same recordable disk (with or without copy protection). The same disk can then be used in various consumer electronic devices (e.g. CD or DVD player). The solution provides the user more choice without imposing technical burdens to him. No registration, on-line payment or installing of software is required. In contrast, current solutions to download media over the internet are too complicated for mainstream users. Conventional CDs/DVDs, however, do not provide enough choice since their content is fixed in advance. That is, regular audio discs do not offer enough choice for an individual compilation of data for a user.

According to the present invention, downloading content without using complicated search and payment technologies is possible. Further, a well-known and accepted key data carrier can be used.

As already mentioned, the advantages of the present invention are: ease of use, standard payment, no permanent storage on hard disk, more choice for the consumer, anonymous, support of anti-piracy, individual watermarking, optional copy protection onto the data carrier.

According to a preferred embodiment of the present invention, a small and individual software client is stored on a recordable disk (CD-R CD-RW, Hybrid CD, DVD-R, DVD-RW, others). When the disk is entered into a CD burner of a PC, the software starts automatically, presenting the user with a simple user interface, showing a selection of content items, which he can choose to put on the same disk. After the user has selected the content items in this user interface, he can decide to complete the disk for future usage. An internet connection is established (ideally broadband), a unique CD code being embedded within the CD is verified and the requested content items are securely downloaded and burned on the same disk. The disk can then be used in a PC or in other consumer electronic devices (e.g. CD player, DVD player, PlayStation, . . . ) to enjoy the content. The disk is available in retail at several price points, allowing the consumer to decide how many content items he wants on the disk. For example, the more expensive the disk is, the more content can be downloaded and stored onto the disk or the higher the quality of the content to be downloaded is. Different content items can be priced at different points (e.g. chart music: 10 points, classic music: 5 points). The present invention gives more choice and possibility to address specific target group segments (e.g. MTV monthly, Best of Mozart—"You Choose").

Due to the present invention, it is very simple for a user to compile a disk comprising individual content: in a preferred embodiment only the following steps are needed:
1. Buy ValueDisk in retail.
2. Insert disk in disk drive.
3. Select Content.
4. Use disk in PC and CE (Consumer Electronic) device.

It is also possible to suggest new content to be downloaded for a user by analyzing already downloaded content or by analyzing selected content to be downloaded (user preference). For this purpose, the server may ask the user to specify personal data like address data or e-mail data when downloading content for the first time. The present invention provides more possibilities to control content (watermarking), preferably only one download per disk is performed.

Examples for the use of the invention are:
a) A radio station issues a music CD, which can be individually assembled by the user which can individually select items from various chart music titles, classic rock titles, and comedy or talk frequencies.
b) A label issues a best artist album, where the user can select from all songs on every album ever made by this artist to compile his personal CD.
c) Value DVDs are sold in retail, with a collection of movies displayed in the DVD booklet. A user selects a movie at home and the movie is securely burned onto the sold DVD.
d) The client is a backup program and user data is burned on the DVD directly.

REFERENCE SYMBOLS 1 system
2 server
3 networkable device
4 communication network
5 network connection means
6 content selection means
7 authentication means
8 database
9 network connection means
10 browser means
11 processing means
12 interface means
13 connection means
14 recording medium
15 application medium
16 recording section
A, B, C content part
20 vendor's shop
21 server
22 user's home

The invention claimed is:
1. A method for receiving content via a network, the method comprising:
establishing, by a network device, a connection with a server via the network;
storing, by the network device, a currency balance on a recording medium of the network device;
receiving, by the network device, the content from the server according to a streaming process such that parts of the content that have already been received from the server are written onto the recording medium, by the network device, before all remaining parts of the content have been received from the server;
receiving, by the network device from the server, a command to update the currency balance by a credit amount associated with the received content;
decreasing, by the network device according to the command, the stored currency balance by the credit amount; and
storing, by the network device according to the command, the decreased currency balance on the recording medium.
2. The method according to claim 1, further comprising:
storing, by the network device, access information on the recording medium, the access information required to access the content stored on the server and including at least one of network address information and authentication information.

3. The method according to claim 2, further comprising:
accessing, by the network device, the content stored on the server, according to the access information, so as to receive the content from the server.

4. The method according to claim 2, wherein the network device establishes the connection and receives the content according to the access information, which includes the authentication information.

5. The method according to claim 4, further comprising:
receiving, by the network device, a user input to provide at least a portion of the authentication information.

6. The method according to claim 3, further comprising:
updating, by the network device, the access information stored on the recording medium after the content is accessed by changing, by the network device, the access information to indicate a specific content that is allowed to be received from the server; and
storing, by the network device, the changed access information on the recording medium.

7. The method according to claim 3, wherein the access information identifies an amount or a type of content that may be received from the server during the receiving.

8. The method according to claim 1, wherein
the currency balance includes a type of content that is allowed to be received from the server.

9. The method according to claim 1, wherein the recording medium is a recordable CD, a recordable DVD, a recordable blue ray disk, a hybrid CD, a hard disk, a memory stick, a memory card, or a memory part of a MP 2/3/4 player, phone, personal computer, or handheld device.

10. A network device, comprising:
circuitry configured to
establish a connection with server via a network;
store a currency balance on a recording medium;
receive content from the server according to a streaming process such that parts of the content that have already been received from the server are written onto the recording medium, by the circuitry, before all remaining parts of the content have been received from the server;
receive from the server, a command to update the currency balance by a credit amount associated with the received content;
decrease, according to the command, the stored currency balance by the credit amount; and
store, according to the command, the decreased currency balance on the recording medium.

11. The network device according to claim 10, wherein the circuitry is further configured to store access information on the recording medium, the access information required to access the content stored on the server and including at least one of network address information and authentication information.

12. The network device according to claim 11, wherein the circuitry is further configured to access the content stored on the server, according to the access information, so as to receive the content from the server.

13. The network device according to claim 11, wherein the circuitry establishes the connection and receives the content according to the access information, which includes the authentication information.

14. The network device according to claim 13, wherein the circuitry is further configured to receive a user input to provide at least a portion of the authentication information.

15. The network device according to claim 12, wherein
the circuitry is further configured to:
update the access information stored on the recording medium after the content is accessed by changing the access information to indicate a specific content that is allowed to be received from the server, and
store the changed access information on the recording medium.

16. The network device according to claim 12, wherein the access information identifies an amount or a type of content that may be received from the server during the receiving.

17. The network device according to claim 10, wherein
the currency balance includes a type of content that is allowed to be received from the server.

18. A non-transitory computer-readable medium storing executable instructions that, when executed by circuitry of a network device, cause the circuitry to:
establish a connection with a server via a network;
store a currency balance on a recording medium;
receive content from the server according to a streaming process such that parts of the content that have already been received from the server are written onto the recording medium before all remaining parts of the content have been received from the server;
receive, from the server, a command to update the currency balance by a credit amount associated with the received content;
decrease, according to the command, the stored currency balance by the credit amount; and
store, according to the command, the decreased currency balance on the recording medium.

* * * * *